United States Patent
Sharma et al.

(10) Patent No.: US 11,501,263 B2
(45) Date of Patent: Nov. 15, 2022

(54) METHOD TO AUTOMATICALLY UPDATE MEETING INVITES FOR ANY CHANGES IN DISTRIBUTION LIST

(71) Applicant: Avaya Management L.P., Durham, NC (US)

(72) Inventors: Tanvi Sharma, Pune (IN); Navanath Navaskar, Pune (IN); Pragati Dhumal, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/156,043

(22) Filed: Jan. 22, 2021

(65) Prior Publication Data
US 2022/0237569 A1 Jul. 28, 2022

(51) Int. Cl.
*G06Q 10/10* (2012.01)
*H04L 51/48* (2022.01)
*H04L 67/75* (2022.01)

(52) U.S. Cl.
CPC ....... *G06Q 10/1095* (2013.01); *G06Q 10/107* (2013.01); *H04L 51/48* (2022.05); *H04L 67/75* (2022.05)

(58) Field of Classification Search
CPC ............. G06Q 10/1095; G06Q 10/107; G06Q 10/1093; G06Q 10/06311; G06Q 10/063114; G06Q 10/06314; G06Q 10/109; H04L 51/28; H04L 67/36; H04L 51/48; H04L 67/75
See application file for complete search history.

(56) References Cited

U.S. PATENT DOCUMENTS

| | | | | |
|---|---|---|---|---|
| 2007/0112881 | A1* | 5/2007 | Lyle | G06Q 10/109 |
| 2008/0270211 | A1* | 10/2008 | Vander Veen | G06Q 10/1095 705/7.19 |
| 2014/0237055 | A1* | 8/2014 | Burrell | H04L 51/28 709/206 |
| 2014/0310045 | A1* | 10/2014 | Meltzer | G06Q 10/1095 705/7.19 |
| 2017/0357950 | A1* | 12/2017 | Bennett | G06F 3/0486 |
| 2018/0197152 | A1* | 7/2018 | Mendes | H04L 51/18 |

FOREIGN PATENT DOCUMENTS

EP 2224387 A1 * 9/2010 ........... G06Q 10/109

* cited by examiner

*Primary Examiner* — Chirag R Patel
*Assistant Examiner* — Rachel J Hackenberg
(74) *Attorney, Agent, or Firm* — Sheridan Ross P.C.

(57) ABSTRACT

A collection of individuals will often be grouped together, such as a team or department or an ad hoc grouping, such as to perform a specific task. These collections are often established as distribution lists receiving communications, such as text messages and emails addressed to the distribution list, rather than the individual members of the distribution lists. Often the communication may comprise meeting invitations, which are then provided to the members. However, if a new member is added or an existing members leaves, the calendaring systems may not consider these modifications. By automatically inviting newly added members to an event that were the subject of a communication sent before the new member was added, the new member can be notified of the event and respond accordingly. Similarly, departing members can automatically be removed or have attendance declined for any event previously accepted as a member of the distribution list.

20 Claims, 6 Drawing Sheets

METHOD TO AUTOMATICALLY UPDATE MEETING INVITES FOR ANY CHANGES IN DISTRIBUTION LIST

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for managing communications on a network and particularly to automatically sending updated event messages.

BACKGROUND

Network-based communication systems, such as emails and text messages, often rely on distribution lists to make communications between a set of users more manageable. However, with the convenience comes the need for diligence when maintaining distribution lists. Meeting invitations may be sent out to the distribution lists and forwarded to individual members who may respond with an indication of their planned attendance.

As members are added to the distribution list, it may be necessary to comb through past invitations, which relate to future events, to ensure that new members are made aware of such meetings. Similarly, departing members may erroneously be maintained on an event, which may cause updates (e.g., changes in time, location, etc.) to be sent to a former member, thereby wasting network and processing resources. Both of the foregoing tasks rely on human diligence which provides ample opportunity for mistakes and errors by omission.

SUMMARY

When a new member is added to a distribution list, such as by a distribution list administrator, current communications, such as events (e.g., meetings) subsequently sent to the distribution list will also include the new member. However, meetings occurring in the future may have been initiated via an invitation message sent to the distribution list prior to the new member being added. Accordingly, the new member may be unaware, and subsequently miss, upcoming events.

When an existing member is removed from a distribution list, they may still receive communications or otherwise have events on their calendar that they will no longer attend as a non-member of the distribution list. Similarly, event organizers and other personnel may be presented with a list of attending parties, including the departing member, and take actions (e.g., allocate meeting space, network bandwidth, etc.) with the mistaken belief that the removed member is still attending.

These and other needs are addressed by the various embodiments and configurations of the present invention. The present invention can provide a number of advantages depending on the particular configuration. These and other advantages will be apparent from the disclosure of the invention(s) contained herein.

In one embodiment, when the administrator of any distribution list adds a new member, they will get a popup asking, if they want to forward all the meeting invites intended for this distribution list to the newly added member. If they select, 'yes' all the invites should automatically be forwarded to new member. Additionally or alternatively, prompting may be omitted wherein the meeting invitations are automatically sent to the new member upon being added to the distribution list and without any other human input.

In another embodiment, when an existing member is deleted from a distribution list, the administrator is prompted to cancel all meetings for the departing member where the distribution list was the invitee to the meeting and the departing member received the invitation while a member. Additionally or alternatively, prompting may be omitted wherein the meetings are canceled, removed from the departing members calendar, and/or declined automatically upon being removed from the distribution list and without any other human input.

In one embodiment, a method is disclosed, comprising: maintaining, in a data storage, a distribution list comprising a number of member records of members, each member record comprising a member address to a location on a network for a corresponding member; receiving, via a user interface, an add member command and associated new member address; in response to the add member command, creating a new member record of the number of member records, populating the address of the new record with the new member address, and adding the new member record to the number of member records; identifying, in the data storage, a calendar record comprising a scheduled event; automatically creating a notification message addressed to the new member address and comprising the calendar event; and sending the notification message to the new member address.

In another embodiment, a method is disclosed, comprising: maintaining, in a data storage, a distribution list comprising a number of member records of members, each member record comprising a member address to a location on a network for a corresponding member; receiving, via a user interface, a delete member command indicating a departing one of the members; in response to the delete member command, deleting from the distribution list, one of the number of member records having the member address matching a departing member address associated with the departing member; identifying a calendar record comprising a scheduled event and wherein an attendee of the scheduled events comprises an indicia of the distribution list, wherein each member address previously received an invitation to attend the scheduled event; automatically creating a cancellation event message to cancel attendance for the departing member; and sending the cancelation event message to a scheduling component In another embodiment, a system is disclosed, comprising: a data storage maintaining a distribution list; a user interface; and a processor configured with machine-readable instructions maintained in a non-transitory storage; and wherein the processor: receives, from the user interface, an update command to update the distribution list comprising a number of members, wherein each member of the list of members comprises an address on a network for a corresponding member; updates the distribution list in accordance with the update command; accesses a calendaring record of the distribution list; automatically generate an update message comprising a modification to apply to the distribution list causing a change in an attendance indicator in accordance with the update; and sending the update message to a scheduling component.

A system on a chip (SoC) including any one or more of the above embodiments or aspects of the embodiments described herein.

One or more means for performing any one or more of the above embodiments or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
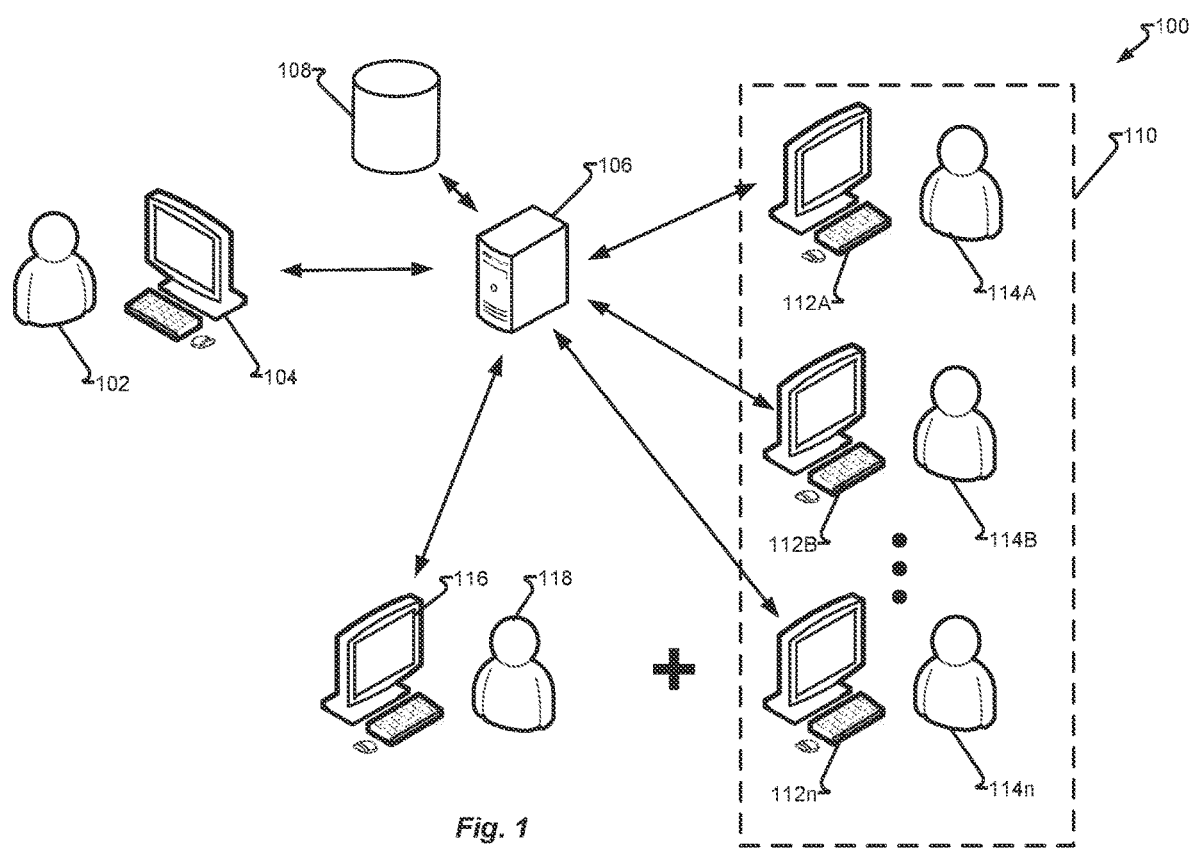
FIG. 1 depicts a first system in accordance with embodiments of the present disclosure.

FIG. 1 depicts system 100 in accordance with embodiments of the present disclosure. In one embodiment, administrator 102 utilizes user interface 104 to maintain a distribution list for communications maintained on data storage 108. Administrator 102 may, or may not, be a member of the distribution list. At least one microprocessor (or, more simply, "processor") of server 106 receives commands from user interface 104 to alter the contents of the distribution list and performs operations indicated by the commands on the distribution list maintained in data storage 108.

It should be appreciated that the network topology illustrated is non-limiting and that other topologies may be utilized without departing from the scope of the embodiments herein. For example, server 106 and/or data storage 108 may be integrated with user interface 104. In other embodiments, user interface 104 comprises a network interface to a network to communicate with other nodes, which may include any one or more of server 106, data storage 108 network node 116, and user terminal 112A-n.

Distribution list members 110 comprise records for member 114A-n, utilizing user terminal 112A-n, respectively.

While network node 116 and user terminal 112A-n may be dedicated devices or shared devices to receive, view, and send communications, including messages related to meetings (e.g., meeting invites, send acceptance, decline, and tentative acceptance), and/or perform other operations. Accordingly, a message, including a message regarding an event, addressed to distribution list members 110 may be delivered to an associated node (e.g., network node 116, user terminal 112A-n) configured to receive messages from the network of nodes when addressed to the associated member. In response, the node may present the message and/or processing a reply (e.g., accept, decline, tentative decline, cancel, etc.) received from an associated member (e.g., new member 118, member 114a-n). Accordingly, one or more of user interface 104, network node 116, and/or user terminal 112A-n may be embodied as a computing device (e.g., personal computer, tablet, etc.) comprising a network interface to a network and/or a communication device (e.g., computing device configured for communications, cellular telephone, networked attached device, terminal, etc.) operable to communicate with at least one other node and/or server 106 via a network, such as Internet/Intranet, Wi-Fi, Bluetooth, cellular, wired telephony, and/or other electronic (electrical, radio frequency, electro-optical, etc.) network or combination thereof.

In one embodiment, system 100 is utilized to add new member 118 to distribution list members 110. It should be appreciated that terminology, such as used when referring to adding, removing, or communicating with a member is implemented as adding an address on a network associated with a member, or deleting an address associated with a member, or sending a message to an address associated with a member, respectively. The embodiments herein are entirely directed towards computing and networking systems and methods for communicating between nodes on a network and data processing and storage. The embodiments herein specifically exclude natural human-to-human communications that may be performed without the use of networked communication nodes.

Upon administrator 102 adding new member 118 to distribution list members 110, server 106 determines if data storage 108 comprises a calendaring records for the distribution list. If calendaring records are found for an event, that has been communicated to distribution list members 110 prior to the occurrence of the event, which has not yet occurred, then server 106 may execute instructions to notify new member 118. For example, at least one processor of server 106 may automatically forward a prior invitation to the event or format a new invitation to the event and send the invitation to new member 118 via an address associated with new member 118. As a result, new member 118 is made aware of the upcoming event that was the subject of a past invitation to distribution list members 110.

Figure 2:
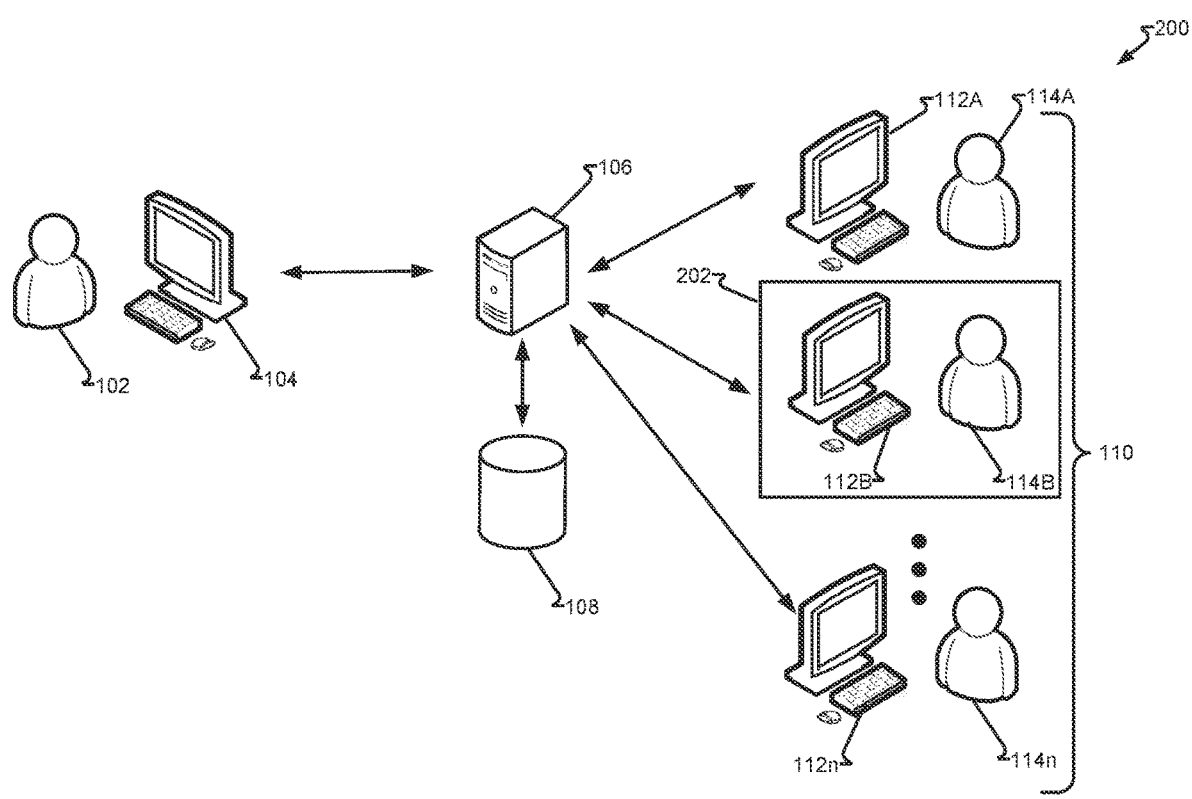
FIG. 2 depicts a second system in accordance with embodiments of the present disclosure.

FIG. 2 depicts system 200 to modify a distribution list in accordance with embodiments of the present disclosure. When member to be removed 202 is indicated, such as by administrator 102 utilizing user interface 104 to cause server 106 to update distribution list members 110 in data storage 108, in one embodiment, a processor of server 106 automatically removes member 114B from events previously indicated that member 114B would attend. In one embodiment, an update message is generated wherein the event is declined and/or indicia of member 114B is removed from the attendees of the event.

In certain communication messages, individuals of a distribution list may be utilized individually for events and presenting intended presence at the event. If an update occurs to the event (e.g., change of location, time, agenda, etc.), a removed member may still have a presence within the list of attendees. Accordingly, by automatically sending a 'cancel' or otherwise removing indicia of the former member 114B of distribution list members 110, user terminal 112B, and therefore member 114B, will no longer be shown as attended nor receive any subsequent updates sent to meeting attendees or distribution list members 110.

Figure 3:
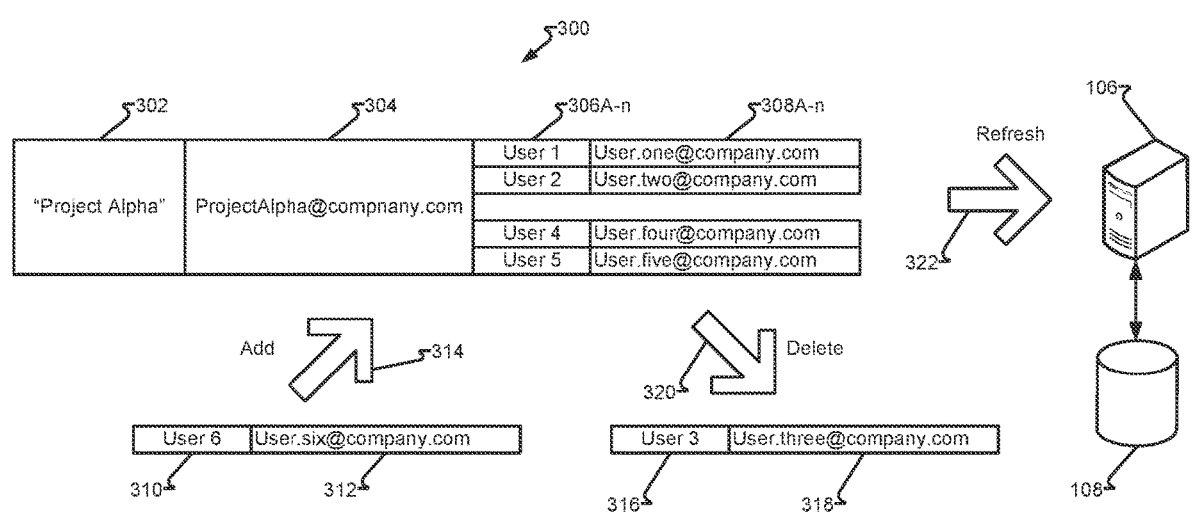
FIG. 3 depicts a distribution list and modifications thereto in accordance with embodiments of the present disclosure.

FIG. 3 depicts process 300 in accordance with embodiments of the present disclosure. In one embodiment, distribution list members 110 is embodied as entries in distribution list 300. Distribution list 300 may be maintained in data storage 108 and updates to distribution list 300 may be applied directly to the contents of data storage 108 and/or applied to a copy maintained in server 106 and the copy saved to data storage 108 so as to cause the copy to be distribution list 300.

Distribution list 300 may comprise name field 302, such as name, that when presented on a device, such as user interface 104 is readily understood by administrator 102. Distribution list 300 may further comprise address field 304, such as to enable messages, which may include meeting invitations and/or updates, may be sent to the contents of address field 304 and be disseminated to the members of distribution list 300. Accordingly, member identifier 306A-n comprises a number of records indicating a member, such as a name of each member (member 114A-n) and their address on the network in member address field 308A-n.

In one embodiment, a meeting invitation sent to the address maintained in address field 304 (e.g., "ProjectAlpha@company.com") will be forwarded, such as by a processor of server 106 to each member address within member address field 308A-n.

In another embodiment, administrator 102, utilizing user interface 104, may add members to distribution list 300 in process 314, to comprise an additional entry within member identifier 306A-n for new member 310 and with a corresponding entry of the new members address 312 for member address field 308A-n.

In another embodiment, administrator 102, utilizing user interface 104, may remove members to distribution list 300. Administrator 102 may indicate departing member 316 is to be removed. As a result, the corresponding entry in member identifier 306A-n and corresponding entry in member address field 308A-n is deleted in process 320.

Changes to distribution list 300 may be processed by server 106 for storage in data storage 108 as the current version of distribution list 300.

Figure 4:
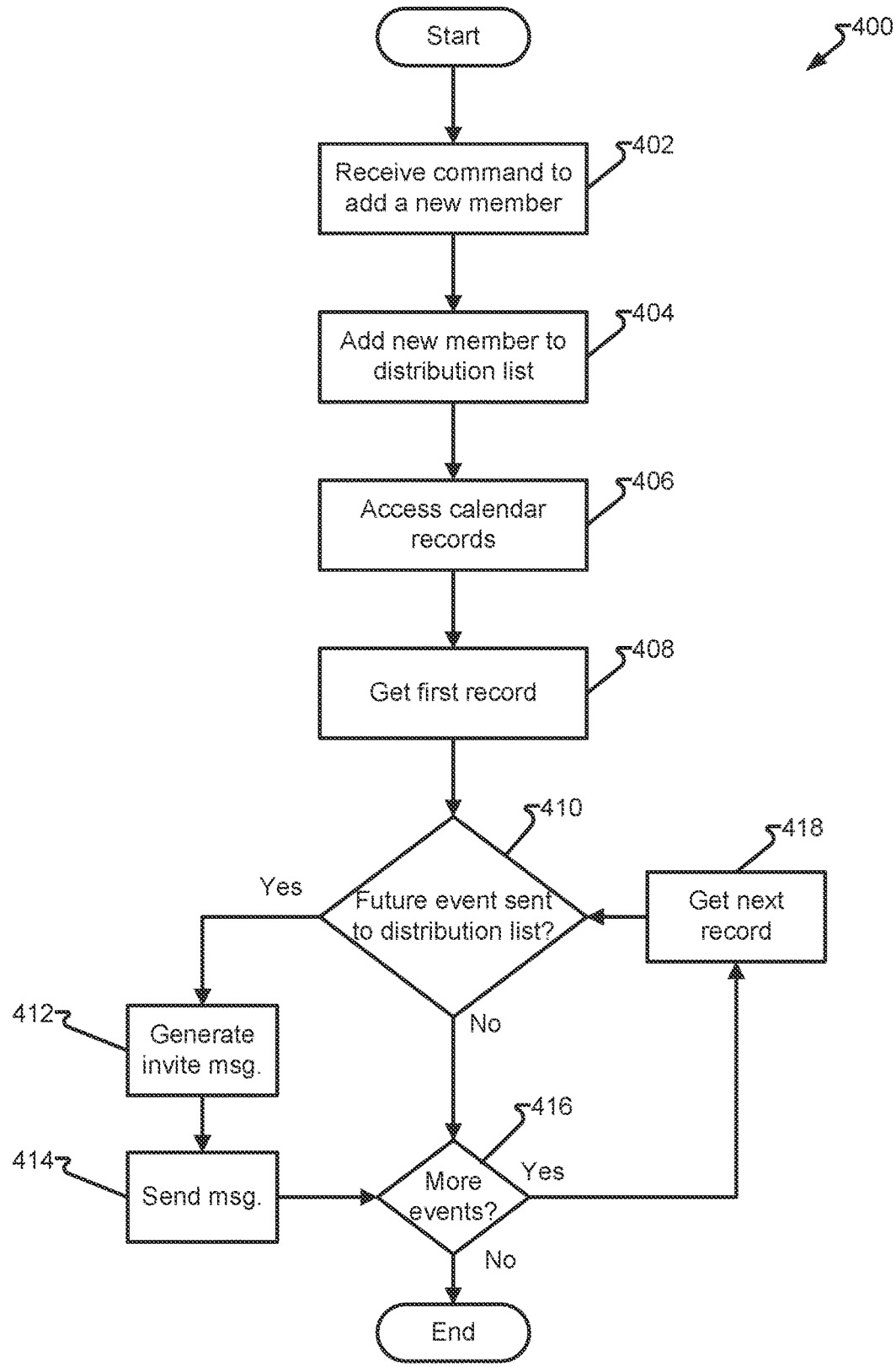
FIG. 4 depicts a first process in accordance with embodiments of the present disclosure.

FIG. 4 depicts process 400 in accordance with embodiments of the present disclosure. In one embodiment, process 400 is embodied as machine-executable instructions maintained in a non-transitory storage that, when read by a processor such as a processor of server 106, to execute the steps of process 400.

Process 400 beings and, in one embodiment, step 402 receives a command to add a new member to a distribution list, such as to add new member 118 to become a member of distribution list members 110. Step 404 then adds the new member to the distribution list. In one embodiment, user interface 104 presents a prompt to ask administrator 102 whether the newly added member should receive an invitation to past events addressed to the distribution list, for events occurring in the future. However, in another embodiment, no prompting is made and the processor performs step 406 and the remainder of process 400 without human input or intervention.

Step 406 then access calendar records for the distribution list and, in step 408, gets a first record comprising an events for which the distribution list was identified as an invitee. Test 410 determines if the event was sent prior to the new member being added and if the associated event is to occur in the future. If the event is a recurring event, then test 410 determines if at least one instance of the recurring event will occur in the future. If test 410 is determined in the negative, processing continues to test 416. If test 410 is determined in the affirmative, processing continues to step 412 wherein an invite message is generated. Step 412 may generate a new message or forward an existing invitation message and, in step 414, send the message to the newly added member. Processing then continues to test 416. Step 414 may optionally send messages to any interested party associated with the event. For example, the addition of the new member may require a larger meeting room to be utilized and, as a result, the interested party may move the event to a different room. It should be appreciated that the interested party, or one thereof, may be a fully automated resource, such as to automatically place the event in a suitable location.

Test 416 determines if there are more event message and, if determined in the affirmative, processing continues to step 418 to obtain the next record and loop back to test 410. If test 416 is determined in the negative, process 400 may end. It should be appreciated that other ordering of events, such as waiting to send invitations in step 414 may occur after test 416 is determined in the negative, without departing from the scope of the embodiments.

Figure 5:
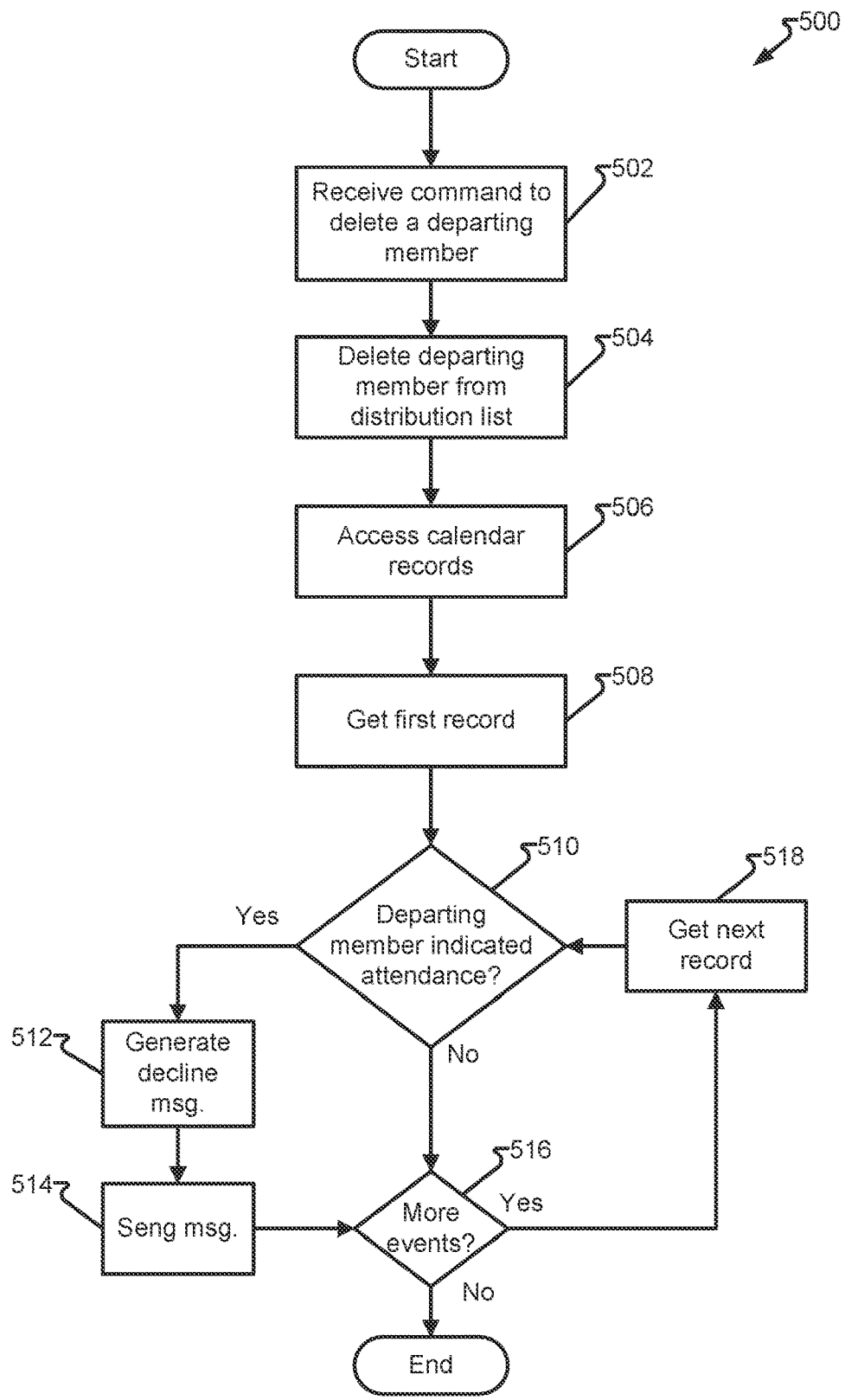
FIG. 5 depicts a second process in accordance with embodiments of the present disclosure.

FIG. 5 depicts process 500 in accordance with embodiments of the present disclosure. In one embodiment, process 500 is embodied as machine-executable instructions maintained in a non-transitory storage that, when read by a processor such as a processor of server 106, to execute the steps of process 500.

Process 500 begins and, in one embodiment, step 502 receives a command to remove a departing member to a distribution list, such as to remove departing member 114B. Step 504 then deletes a record within the distribution list corresponding to departing member 114B. In one embodiment, user interface 104 presents a prompt to ask administrator 102 whether the departing member should be removed from any prior events sent to the distribution list for which they have, or may have, indicated attendance for events occurring in the future. However, in another embodiment, no prompting is made and the processor performs step 506 and the remainder of process 500 without human input or intervention.

Step 506 then access calendar records for the distribution list and, in step 508, gets a first record comprising an events for which the distribution list was identified as an invitee. Test 510 determines if the event has an indication of attendance for the departing member. If test 510 is determined in the negative, processing continues to test 516. If test 510 is determined in the affirmative, processing continues to step 512 wherein a decline invite message is generated. Step 512 may generate a new message or merely remove indicia of the departing member from the event. When a decline message is generated, step 514 sends the message, such as to a calendaring system, other members of the distribution list, to indicate the departing member will not attend the event. Processing then continues to test 516. Step 514 may optionally send messages to any interested party associated with the event. For example, the removal of the departing member may allow a smaller meeting room to be utilized and, as a result, the interested party may move the event to a different room. It should be appreciated that the interested party, or one thereof, may be a fully automated resource, such as to automatically place the event in a suitable location.

Test 516 determines if there are more event message and, if determined in the affirmative, processing continues to step 518 to obtain the next record and loop back to test 510. If test 516 is determined in the negative, process 500 may end. It should be appreciated that other ordering of events, such as waiting to send cancellation messages in step 514 may occur after test 516 is determined in the negative, without departing from the scope of the embodiments.

Figure 6:
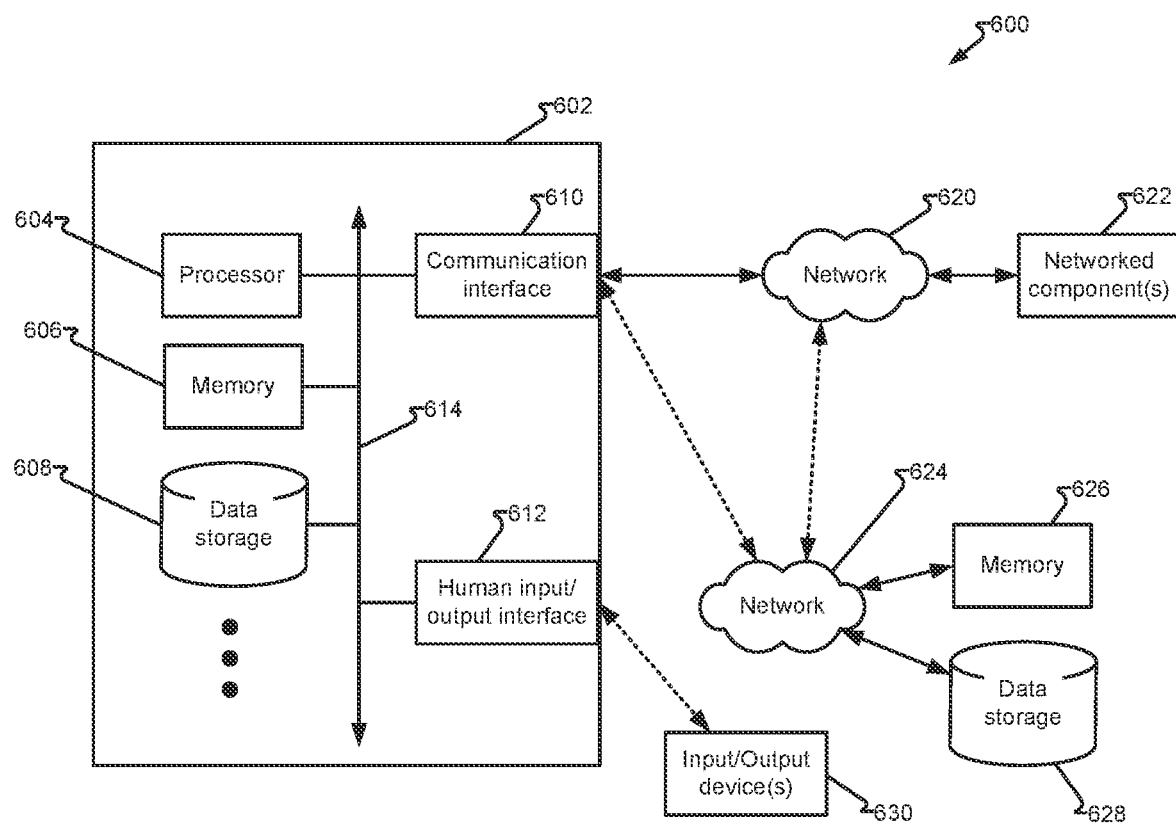
FIG. 6 depicts a second system in accordance with embodiments of the present disclosure.

FIG. 6 depicts device 602 in system 600 in accordance with embodiments of the present disclosure. In one embodiment, user interface 104 and/or server 106 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or utilize one or more networks, such as network 620 and/or network 624.

The network utilized for inter-node communications may be embodied, in whole or in part, as network 620. Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.)

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) that networked components 622, which may be connected to network 620 comprising a public network (e.g., Internet) that may not be as trusted.

Components attached to network 624 may include memory 626, data storage 628, input/output device(s) 630, and/or other components that may be accessible to processor 604. For example, memory 626 and/or data storage 628 may supplement or supplant memory 606 and/or data storage 608 entirely or for a particular task or purpose. For example, memory 626 and/or data storage 628 may be an external data repository (e.g., server farm, array, "cloud," etc.) and allow device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of memory 606, data storage 608, memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, switch, port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™ microprocessors, ARM® Cortex-A and ARIVI926EJS™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
   maintaining, in a data storage, a distribution list comprising a number of member records, each member record of the number of member records comprising a member address to a location on a network for a corresponding member;
   receiving, via a user interface, an add member command and a new member address associated with the add member command;
   in response to the add member command, creating a new member record of the number of member records, populating the member address of the new member record with the new member address, and adding the new member record to the number of member records;
   identifying, in the data storage, a calendar record that comprises a scheduled event that further comprises a list of invitees that match corresponding members of the member records of the distribution list in response to creating the new member record;
   automatically creating an attendance notification message addressed to the member address of each of the number of member records and comprising a calendar event; and
   sending the attendance notification message to the member address of each of the number of member records.

2. The method of claim 1, wherein identifying the calendar record comprising the scheduled event, further comprises, identifying the scheduled event as having an attendee of the scheduled event comprising an indicia of the distribution list.

3. The method of claim 1, wherein identifying the calendar record comprising the scheduled event, further comprises, identifying the scheduled event as having a list of invitees comprising a grouping of the member address for the number of member records of the distribution list.

4. The method of claim 1, wherein identifying the scheduled event further comprises identifying the scheduled event as having an indicia indicating at least one member of the distribution list will attend.

5. The method of claim 1, wherein the scheduled event comprises a series of recurring events having at least one event, of the series of recurring events, occurring in the future.

6. The method of claim 1, wherein the calendar event is an invitation to attend a meeting.

7. The method of claim 1, wherein the calendar event comprises a last invitation of a plurality of invitations for a same scheduled event.

8. A method, comprising:
   maintaining, in a data storage, a distribution list comprising a number of member records, each member record of the number of member records comprising a member address to a location on a network for a corresponding member;
   receiving, via a user interface, a delete member command indicating a departing member;
   in response to the delete member command, deleting from the distribution list, one of the number of member records having the member address matching a departing member address associated with the departing member;
   identifying a calendar record comprising a scheduled event that further comprises a list of invitees that match the corresponding members of member records of the distribution list, wherein an invitation to attend the scheduled event was previously sent to each member address of the number of member records;
   automatically creating a cancellation event message to cancel attendance for the departing member; and
   sending the cancelation event message to a scheduling component and sending, on behalf of the departing member, a decline response to each member address.

9. The method of claim 8, wherein the scheduled event comprises the invitation.

10. The method of claim 8, wherein the calendar record is limited to calendar events for which the departing member has indicated attendance.

11. The method of claim 8, wherein the calendar record is limited to calendar events for which the departing member has indicated tentative attendance.

12. A system, comprising:
   a data storage maintaining a distribution list comprising member records of a number of members, wherein each member record of the distribution list comprises a member address on a network for a corresponding member;
   a user interface; and
   a processor configured with machine-readable instructions maintained in a non-transitory storage; and
   wherein the processor:
      receives, from the user interface, an update command to update the distribution list and thereby alter the member records;
      updates the distribution list in accordance with the update command;
      accesses a calendaring record of the distribution list;
      identifies a calendar record that comprises a scheduled event that further comprises a list of invitees that matches the distribution list;
      automatically generates an update message comprising a modification to apply to the distribution list causing a change in an attendance indicator in accordance with the update command; and
      sends the update message to a scheduling component and to each member address.

13. The system of claim 12, further comprising:
a network interface to a network; and
wherein the update command comprises an add member command and having a new member address for a new member; and
wherein the processor:
- updates the distribution list in accordance with the update command comprising adding the new member address to the distribution list; and
- sends, via the network interface, an invitation to the scheduled event to new member address.

14. The system of claim 13, wherein the processor identifies the calendar record comprising the scheduled event, further comprising identifying the scheduled event comprising an indicia indicating at least one member will attend.

15. The system of claim 12, comprising:
a network interface to a network; and
wherein the update command comprises a delete member command indicating a departing member; and
wherein the processor:
- updates the distribution list in accordance with the update command comprising deleting one member, of the distribution list, from the distribution list that matches the departing member;
- identifies the calendar record comprising the scheduled event and an attendee of the scheduled event comprises an indicia of the distribution list; and
- cancels attendance of the scheduled event for the departing member.

16. The system of claim 15, wherein:
the delete member command indicating the departing member, comprises a departing name of the departing member; and
the one member that matches the departing member further comprising one of the distribution list comprising a member name matching the departing name.

17. The system of claim 15, wherein:
the scheduled event comprises an invitation; and
canceling attendance further comprises sending, on behalf of the departing member, a decline response to the invitation.

18. The system of claim 15, wherein the calendar record is limited to calendar events for which the departing member has indicated attendance.

19. The system of claim 15, wherein the scheduled event is an invitation to attend a meeting.

20. The system of claim 15, wherein the scheduled event comprises a last invitation of a plurality of invitations for a same scheduled event.

* * * * *